(12) United States Patent
Gavin

(10) Patent No.: US 7,551,073 B2
(45) Date of Patent: Jun. 23, 2009

(54) METHOD, SYSTEM AND PROGRAM PRODUCT FOR ALERTING AN INFORMATION TECHNOLOGY SUPPORT ORGANIZATION OF A SECURITY EVENT

(75) Inventor: Andrew J. Gavin, DeWitt, MI (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 11/621,719

(22) Filed: Jan. 10, 2007

(65) Prior Publication Data

US 2008/0168531 A1 Jul. 10, 2008

(51) Int. Cl.
*G08B 29/00* (2006.01)
*G06F 17/00* (2006.01)
*G06F 7/00* (2006.01)

(52) U.S. Cl. .................... 340/506; 340/525; 726/1; 726/10; 726/23; 726/26

(58) Field of Classification Search ................ 340/506; 726/10
See application file for complete search history.

(56) References Cited

U.S. PATENT DOCUMENTS

| | | | |
|---|---|---|---|
| 5,991,881 A | 11/1999 | Conklin et al. | |
| 6,957,186 B1 | 10/2005 | Guheen et al. | |
| 7,020,697 B1 | 3/2006 | Goodman et al. | |
| 2002/0087882 A1 | 7/2002 | Schneier et al. | |
| 2003/0005331 A1 | 1/2003 | Williams | |
| 2003/0221123 A1 | 11/2003 | Beavers | |
| 2004/0044912 A1 | 3/2004 | Connary et al. | |
| 2004/0064731 A1 | 4/2004 | Nguyen et al. | |
| 2004/0260947 A1 | 12/2004 | Brady et al. | |
| 2005/0038818 A1 | 2/2005 | Hooks | |
| 2005/0144151 A1 | 6/2005 | Fischman et al. | |
| 2005/0204404 A1 | 9/2005 | Hrabik et al. | |
| 2006/0010492 A9 | 1/2006 | Heintz et al. | |
| 2006/0070128 A1 | 3/2006 | Heimerdinger et al. | |
| 2006/0101519 A1 | 5/2006 | Lasswell et al. | |
| 2006/0161816 A1 | 7/2006 | Gula et al. | |

OTHER PUBLICATIONS

International Search Report dated Apr. 11, 2008.

*Primary Examiner*—Donnie L Crosland
(74) *Attorney, Agent, or Firm*—Silvy A. Murphy; John R. Pivnichny

(57) ABSTRACT

A method, system and program product for alerting an information technology support organization of a security event is provided. The method includes storing in a trouble ticket alerting system trouble tickets corresponding to security events logged for a system. Further, the method includes analyzing, at a pre-determined time interval, recently logged security events among the security events logged, the recently logged security events being logged within the pre-determined time interval, comparing a recent security event of the recently logged security events to each of the trouble tickets, automatically creating a new trouble ticket when no match is found to an existing trouble ticket and if the recent security event matches an existing trouble ticket, escalating the existing trouble ticket, such that an information technology support organization is alerted of the recent security event so that appropriate action can be taken to alleviate the recent security event.

26 Claims, 3 Drawing Sheets

METHOD, SYSTEM AND PROGRAM PRODUCT FOR ALERTING AN INFORMATION TECHNOLOGY SUPPORT ORGANIZATION OF A SECURITY EVENT

FIELD OF THE INVENTION

The present invention relates to the field of network surveillance systems and, more particularly, the invention relates to a method, system and computer program product for alerting an information technology support organization regarding a security event, such that an alert is automatically created when a security event occurs and the alert is escalated within the organization if the security event continues to occur and, further, closing the alert when the security event ceases to occur.

BACKGROUND OF THE INVENTION

In today's business environment, organizations and/or businesses utilize various types of networks for various purposes, such as, electronic mail (e-mail), storage, applications, etc. As use of networked systems increases, there is an increasing demand for information technology personnel that support and maintain such networked systems. Often, in addition to handling non-security related issues with respect to supporting and maintaining such networked systems, additionally, the information technology personnel are burdened with security concerns, such as viruses and worm outbreaks. This can lead to downtime in responding to such security concerns, which can have a tremendous impact on an organization and/or business. As such, there is a need for an efficient way to manage security related issues that arise on networked systems.

SUMMARY OF THE INVENTION

In a first aspect of the invention, there is provided a method of alerting an information technology support organization of a security event. The method includes storing in a trouble ticket alerting system a plurality of trouble tickets corresponding to a plurality of logged security events for a system on a network monitored by an information technology support organization. Further, the method includes analyzing, at a pre-determined time interval, intrusion detection system logs for one or more recently logged security events of the plurality of logged security events, the one or more recently logged security events being logged within the pre-determined time interval, comparing a recent security event of the one or more recently logged security events to each of the plurality of trouble tickets stored in the trouble ticket alerting system, automatically creating a new trouble ticket in the trouble ticket alerting system when no match is found to an existing trouble ticket corresponding to the recent security event and if the recent security event matches an existing trouble ticket, escalating the existing trouble ticket, wherein the information technology support organization is alerted of the recent security event so that appropriate action can be taken to alleviate the recent security event. In an embodiment, the method includes providing the trouble ticket alerting system for storing therein the plurality of trouble tickets corresponding to the plurality of logged security events and providing an intrusion detection system for logging the plurality of logged security events into the intrusion detection system logs. In an embodiment, the analyzing step includes parsing the intrusion detection system logs having the one or more logged security events for the system on the network. In an embodiment, the creating step includes notifying an owner of the system regarding the recent security event and requesting that the owner alleviate the recent security event. In an embodiment, the escalating step further includes ascertaining whether or not an IP address of the system having the recent security event matches an existing IP address in the existing trouble ticket stored in the trouble ticket alerting system and, if there is an existing trouble ticket, determining if a pre-determined time threshold for escalating the existing trouble ticket corresponding to the recent security event has expired. Further, if the pre-determined time threshold for escalating the existing trouble ticket corresponding to the recent security event has not expired, the method includes logging the recent security event in the existing trouble ticket stored in the trouble ticket alerting system. However, if the pre-determined time threshold for escalating the existing trouble ticket corresponding to the recent security event has expired, the method includes establishing whether or not the existing trouble ticket corresponding to the recent security event has been escalated to a highest notification level, if the existing trouble ticket corresponding to the recent security event has not been escalated to the highest notification level, escalating to a next notification level the existing trouble ticket corresponding to the recent security event, logging the recent security event in the existing trouble ticket, notifying the owner of the system to request alleviation of the recent security event and discontinuing processing the recent security event at the system with the IP address until a next pre-determined time interval. In an embodiment, if the existing trouble ticket corresponding to the recent security event has been escalated to the highest notification level, the method includes logging the recent security event in the existing trouble ticket, notifying the owner of the system that the system will be disconnected from the network, sending to the information technology support organization a request to disconnect the system from the network and closing the existing trouble ticket after the information technology support organization has disconnected the system from the network.

In another aspect of the invention, there is provided a system for alerting an information technology support organization of a security event. The system includes an intrusion detection system configured to log in intrusion detection system logs a plurality of security events for a system within a network monitored by an information technology support organization, a trouble ticket alerting system configured to store therein a plurality of trouble tickets corresponding to the plurality of security events logged in the intrusion detection system logs and a security event aggregator and reporter tool configured to determine, at a pre-determined time interval, whether or not a recent security event among a plurality of logged security events in the intrusion detection system logs corresponds to an existing trouble ticket among the plurality of trouble tickets stored in the trouble ticket alerting system and wherein if the recent security event is determined to not correspond to the existing trouble ticket in the trouble ticket alerting system, the security event aggregator and reporter tool creates a new trouble ticket corresponding to the recent security event and notifies an owner of the system of the recent security event requesting that the owner alleviate the recent security event and wherein if the recent security event is determined to correspond to the existing trouble ticket in the trouble ticket alerting system, the security event aggregator and reporter tool establishes whether or not a pre-determined threshold for escalation has expired before escalating the existing trouble ticket corresponding to the recent security event to a higher notification level, such that the information technology support organization is requested to take appropriate action to alleviate the recent security event. In an embodiment, the security event aggregator and reporter tool is configured to parse the intrusion detection system logs having the plurality of security events logged therein. Further, the security event aggregator and reporter tool is configured to describe the recent security event in the new trouble ticket created and is further configured to provide an IP address for the system and to provide a timestamp corresponding to the recent security event. If the recent security event is determined to correspond to the existing trouble ticket and if the pre-determined threshold for escalation has not expired, the security event aggregator and reporter tool is further configured to log the security event in the existing trouble ticket before notifying the owner of the system requesting alleviation of the recent security event and is configured to discontinue processing the recent security event at the system with the IP address until a next pre-determined time interval. However, if the recent security event is determined to correspond to the existing trouble ticket and if the pre-determined threshold for escalation has expired, the security event aggregator and reporter tool is further configured to log the security event in the existing trouble ticket, to notify the owner of the system that the system will be disconnected from the network and to notify the information technology support organization to disconnect the system from the network. In an embodiment, the security event aggregator and reporter tool is further configured to close the existing trouble ticket either if the recent security event has been alleviated or after the information technology support organization has disconnected the system from the network.

In yet another aspect of the invention, there is provided a computer program product for alerting an information technology support organization of a security event. The computer program product includes a computer readable medium, first program instructions to store in a trouble ticket alerting system a plurality of trouble tickets corresponding to a plurality of logged security events for a system on a network monitored by an information technology support organization and second program instructions to determine, at a pre-determined time interval, whether or not a recent security event among one or more recently logged security events stored in intrusion detection system logs corresponds to an existing trouble ticket among the plurality of trouble tickets stored in the trouble ticket alerting system, the one or more recently logged security events being logged within the pre-determined time interval. In an embodiment, the second program instructions include instructions to parse the intrusion detection system logs for the one or more recently logged security events. Further, the computer program product includes third program instructions to automate creation of a new trouble ticket in the trouble ticket alerting system if the recent security event does not correspond to the existing trouble ticket stored in the trouble ticket alerting system and if the recent security event corresponds to the existing trouble ticket stored in the trouble ticket alerting system, the third program instructions include instructions to establish whether or not a pre-determined threshold for escalation has expired before escalating the existing trouble ticket corresponding to the recent security event, such that the information technology support organization is alerted of the recent security event and can take appropriate action to alleviate the recent security event. In an embodiment, the computer program product further includes fourth program instructions to close the new trouble ticket created for the recent security event either if the recent security event has been alleviated or if the new trouble ticket created has been escalated and to close the existing trouble ticket corresponding to the recent security event either if the recent security event has been alleviated or if the new trouble ticket created has been escalated. In an embodiment, the computer program product wherein the third program instructions include instructions to describe in the new trouble ticket created the recent security event, to provide an IP address for the system and to provide a timestamp corresponding to the recent security event. In an embodiment, the third program instructions include instructions to log the recent security event in the existing trouble ticket before notifying an owner of the system to alleviate the recent security event and further includes instructions to stop processing the recent security event at the system with the IP address until a next pre-determined time interval. If the recent security event is determined to correspond to the existing trouble ticket and if the pre-determined threshold for escalation has expired, the third program instructions include instructions to log the recent security event in the existing trouble ticket, to notify the owner of the system that the system will be disconnected from the network and to notify the information technology support organization to disconnect the system from the network. In an embodiment, each of the first, second, third and fourth program instructions are stored on the computer readable medium.

Further, in yet another aspect of the invention, there is provided a process for deploying computing infrastructure includes integrating computer-readable code into a computing system, wherein the code in combination with the computing system is capable of performing a process for alerting an information technology support organization of a security event. The process includes storing in a trouble ticket alerting system a plurality of trouble tickets corresponding to a plurality of logged security events for a system on a network monitored by an information technology support organization, and providing an intrusion detection system for logging the plurality of logged security events into intrusion detection system logs. Further, the process includes analyzing, at a pre-determined time interval, intrusion detection system logs for one or more recently logged security events of the plurality of logged security events, the one or more recently logged security events being logged within the pre-determined time interval and comparing a recent security event of the one or more recently logged security events to each of the plurality of trouble tickets stored in the trouble ticket alerting system and if the recent security event does not match an existing trouble ticket, automatically creating a new trouble ticket in the trouble ticket alerting system and if the recent security event matches the existing trouble ticket, escalating the existing trouble ticket to a highest notification level, wherein the information technology support organization is alerted of the recent security event so that appropriate action can be taken to alleviate the recent security event. The process further includes closing any trouble ticket corresponding to the recent security event after appropriate action has been taken to alleviate the recent security event. In an embodiment, the comparing step includes ascertaining whether or not an IP address of the system having the recent security event matches an existing IP address in the existing trouble ticket stored in the trouble ticket alerting system and, if there is an existing trouble ticket, determining if a pre-determined time threshold for escalating the existing trouble ticket corresponding to the recent security event has expired. Further, if the pre-determined time threshold for escalating the existing trouble ticket corresponding to the recent security event has not expired, the process includes logging the recent security event in the existing trouble ticket stored in the trouble ticket alerting system. However, if the pre-determined time threshold for escalating the existing trouble ticket corresponding to recent security event has expired, the process includes establishing whether or not the existing trouble ticket corresponding to the recent security event has been escalated to a highest notification level, if the existing trouble ticket corresponding to the recent security event has not been escalated to the highest notification level, escalating to a next notification level the existing trouble ticket corresponding to the recent security event, logging the recent security event in the existing trouble ticket, notifying the owner of the system to request alleviation of the recent security event and discontinuing processing the recent security event at the system with the IP address until a next pre-determined time interval. Further, if the existing trouble ticket corresponding to the recent security event has been escalated to the highest notification level, the process includes logging the recent security event in the existing trouble ticket, notifying the owner of the system that the system will be disconnected from the network, sending to the information technology support organization a request to disconnect the system from the network and closing the existing trouble ticket after the information technology support organization has disconnected the system from the network.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
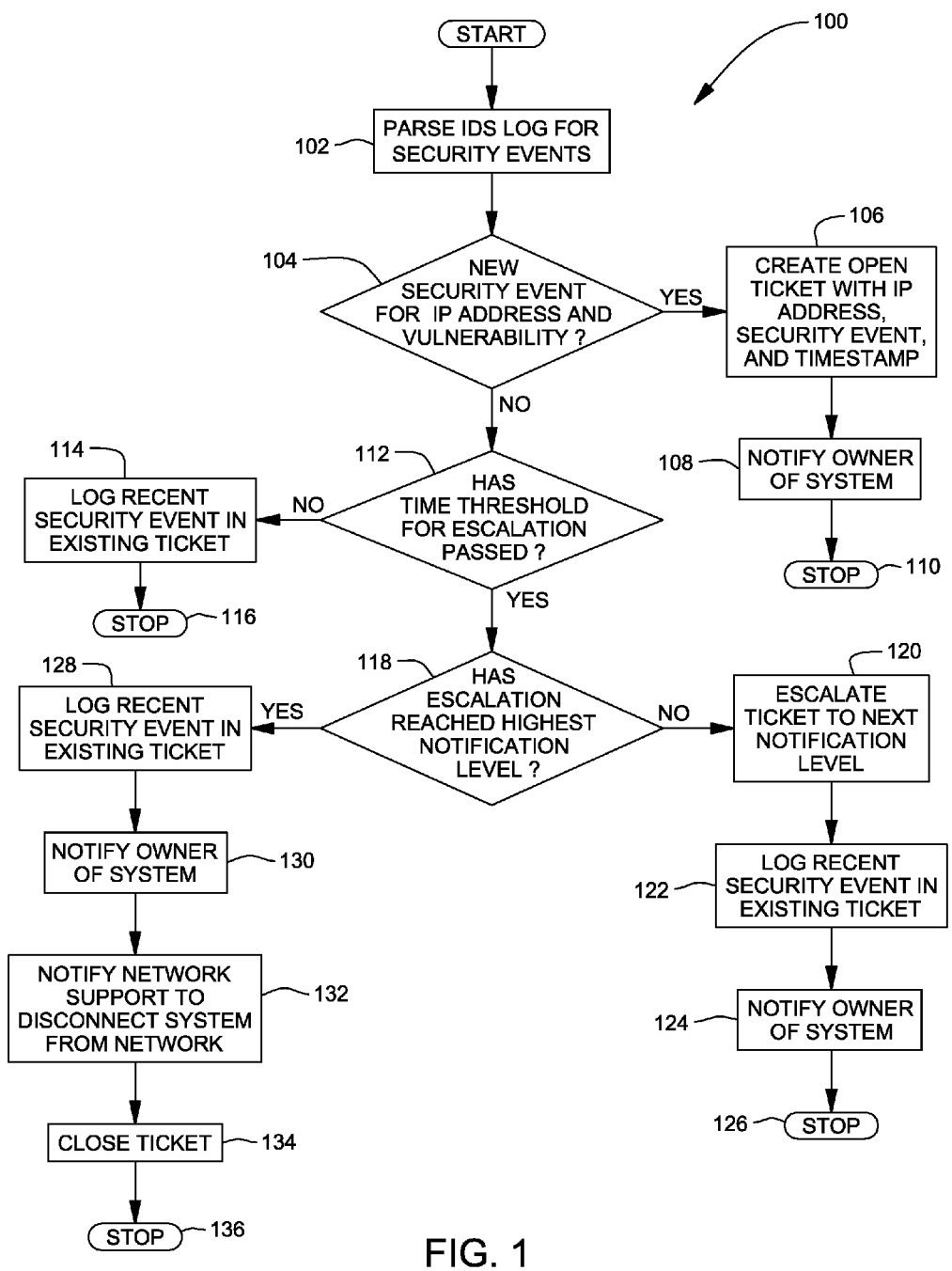
FIG. 1 depicts a flowchart which outlines the steps involved in alerting an information technology support organization of a security event, in accordance with an embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the invention provides a method of alerting an information technology support organization of a security event. The method includes storing in a trouble ticket alerting system a plurality of trouble tickets corresponding to a plurality of logged security events for a system on a network monitored by an information technology support organization. Further, the method includes analyzing, at a pre-determined time interval, intrusion detection system logs for one or more recently logged security events of the plurality of logged security events, the one or more recently logged security events being logged within the pre-determined time interval, comparing a recent security event of the one or more recently logged security events to each of the plurality of trouble tickets stored in the trouble ticket alerting system, automatically creating a new trouble ticket in the trouble ticket alerting system when no match is found to an existing trouble ticket corresponding to the recent security event and if the recent security event matches an existing trouble ticket, escalating the existing trouble ticket, wherein the information technology support organization is alerted of the recent security event so that appropriate action can be taken to alleviate the recent security event. In an embodiment, the method includes providing the trouble ticket alerting system for storing therein the plurality of trouble tickets corresponding to the plurality of logged security events and providing an intrusion detection system for logging the plurality of logged security events into the intrusion detection system logs. In an embodiment, the analyzing step includes parsing the intrusion detection system logs having the one or more logged security events for the system on the network. In an embodiment, the creating step includes notifying an owner of the system regarding the recent security event and requesting that the owner alleviate the recent security event. In an embodiment, the escalating step further includes ascertaining whether or not an IP address of the system having the recent security event matches an existing IP address in the existing trouble ticket stored in the trouble ticket alerting system and, if there is an existing trouble ticket, determining if a pre-determined time threshold for escalating the existing trouble ticket corresponding to the recent security event has expired. Further, if the pre-determined time threshold for escalating the existing trouble ticket corresponding to the recent security event has not expired, the method includes logging the recent security event in the existing trouble ticket stored in the trouble ticket alerting system. However, if the pre-determined time threshold for escalating the existing trouble ticket corresponding to the recent security event has expired, the method includes establishing whether or not the existing trouble ticket corresponding to the recent security event has been escalated to a highest notification level, if the existing trouble ticket corresponding to the recent security event has not been escalated to the highest notification level, escalating to a next notification level the existing trouble ticket corresponding to the recent security event, logging the recent security event in the existing trouble ticket, notifying the owner of the system to request alleviation of the recent security event and discontinuing processing the recent security event at the system with the IP address until a next pre-determined time interval. In an embodiment, if the existing trouble ticket corresponding to the recent security event has been escalated to the highest notification level, the method includes logging the recent security event in the existing trouble ticket, notifying the owner of the system that the system will be disconnected from the network, sending to the information technology support organization a request to disconnect the system from the network and closing the existing trouble ticket after the information technology support organization has disconnected the system from the network.

Reference is now made to FIG. 1, which outlines the method steps involved in alerting an information technology support organization of a security event or issue or incident, in accordance with an embodiment of the invention. As used herein, the term "security event" refers to an event, such as, a virus or worm outbreak on a system. Moreover, the term "affected system" refers to a system on which a security event has been detected or logged. Turning to FIG. 1, reference numeral 100, outlines the steps carried out by a security event aggregator and reporter tool that is configured to alert an information technology support organization, so that appropriate action can be taken to alleviate the security event detected at a system on a network, such as, notifying system owner(s), system administrator(s), network administrator(s) and/or management personnel of the security event. Further, the information technology support organization may even disconnect the affected system from a network, if the security event continues or persists on the system, posing a threat or vulnerability to the network. The method starts with the execution of the security event aggregator and reporter tool or code, which in an embodiment, is configured to run at a pre-determined time interval, that is, on a periodic basis, for instance, every 5 minutes or every 10 minutes, every hour, etc. In particular, the security event aggregator and reporter tool is configured to analyze new intrusion detection system events that are logged in intrusion detection system logs for one or more security events or issues or incidents. In an embodiment, the intrusion detection system logs are stored within an intrusion detection system that is configured to monitor one or more security events for one or more systems on a network and to log or record in the intrusion detection system logs the security events as they occur on the one or more system(s). Further, in an embodiment, the security event or issues are automatically correlated and entered into a trouble ticket or help desk ticket alerting system, such as, a trouble ticket or help desk ticket database, so that an information technology support organization can see what system or systems on a network have on-going or continuing security issues and can take appropriate action to alleviate any vulnerabilities, such as notifying system owner(s), or escalating the security event or issue by notifying system administrator(s), network administrator(s) and/or even management personnel and, further, even disconnecting the affected system in order to alleviate an on-going or continuing security event. As such, in step 102, the security event aggregator and reporter tool parses the intrusion detection system logs for the latest or recent security events that have been logged since the last execution of the security event aggregator and reporter tool. In step 104, for each of the security events logged in the intrusion detection system logs, a determination is made as to whether or not a given recent security event logged for a system having a particular IP address recorded in the intrusion detection system logs is a new security event that poses a vulnerability to the system and/or network. In particular, the security event aggregator and reporter tool checks whether or not the latest or recent security event logged for a system with the IP address matches any existing or open trouble ticket or help desk ticket(s) created and entered into the trouble ticket or help desk ticket alerting system. If it is determined in step 104 that the recent security event logged in the intrusion detection system logs for the system with that IP address does not match any existing trouble ticket or help desk ticket(s) in the trouble ticket or help desk ticket alerting system, then in step 106 the security event aggregator and reporter tool creates in the trouble ticket or help desk ticket alerting system an open trouble ticket or help desk ticket for the recent security event logged, identifying the IP address of the system where the recent security event was recorded or logged, describing the nature of the recent security event or incident as well as entering a timestamp for the recent security event logged. Further, in step 108, the security event aggregator and reporter tool notifies or sends communication to the owner of the system, for instance, via e-mail, notifying the system owner of the recent security event that has been logged, requesting that the owner alleviate the vulnerability with respect to the recent security event. Further, the security event aggregator and reporter tool stops in step 110 any further processing or analyzing of the security event logged for the system having that IP address, until the next time, that is, the next pre-determined time interval, the security event aggregator and reporter tool is run.

Going back to step 104, if it is determined that the recent security event is not a new event and that there is an existing trouble ticket or help desk ticket in the trouble ticket or help desk ticket alerting system that identifies a system with the same IP address as the system with the recent security event, then a determination is made in step 112 as to whether or not a pre-determined time threshold for escalation of the existing trouble ticket or help desk ticket has passed or expired. If it is determined in step 112 that the pre-determined time threshold for escalation of the existing trouble ticket or help desk ticket has not passed or expired, then the security event aggregator and reporter tool logs in step 114 the recent or latest security event in the existing trouble ticket or help desk ticket. In particular, the security event aggregator and reporter tool enters a description and a timestamp for the recent or latest security event, so that the security event(s) occurring on the system with the particular IP address can be tracked and monitored, for instance, for determining whether or not the recent security event is a new security event or a continuing security event. Additionally, any further processing or analyzing of the recent security event that is logged is stopped in step 116 until the pre-determined time threshold for escalation has passed or expired. However, in step 112, if it is determined that the pre-determined time threshold for escalation of the existing trouble ticket or help desk ticket has passed or expired, then in step 118, a determination is made as to whether the escalation has reached the highest notification level, for instance, notifying management personnel versus notifying system owner(s), system administrator(s) and/or network administrator(s). In an embodiment, when escalating an existing trouble ticket or help desk ticket, the chain of notification, that is, who gets notified first, next, etc. all the way up to the highest notification level can be pre-set by an organization depending on the nature, frequency of the security event and/or other factors affecting any business carried out by the organization. Accordingly, if it is determined that the escalation has not reached the highest notification level, then in step 120, the existing trouble ticket or help desk ticket is escalated to the next notification level. For instance, if only the owner of the system affected has been notified and asked to alleviate the recent security event, then the next step may be to notify system and/or network administrators of the security event affecting a given system. Or if system and/or network administrators have been notified, then perhaps management is notified of the recent security event detected or existing on the system. After the existing trouble ticket or help desk ticket has been escalated, in step 122, the security event aggregator and reporter tool logs the recent or latest security event in the existing trouble ticket or help desk ticket. The owner of the system is notified, for instance, via e-mail, of the recent security event in step 124, wherein, the owner is asked to alleviate the recent security event. Further, the security event aggregator and reporter tool stops in step 124 any further processing or analyzing of the recent security event logged for the system having that IP address, until the next time the security event aggregator and reporter tool is run.

Referring back to step 118, if the escalation has reached the highest notification level, then in step 128, the security event aggregator and reporter tool logs the recent or latest security event in the existing trouble ticket or help desk ticket, notifies in step 130 the owner of the system that the system is going to be disconnected from the network. Further, in step 132, the security event aggregator and reporter tool notifies the information technology support organization to request that the system be disconnected from the network. Additionally, in step 134, the security event aggregator and reporter tool closes out the trouble ticket or help desk ticket after the system has been disconnected from the system, thus stopping the processing of all existing security events detected for the system having the corresponding IP address, ending the process at step 136. Accordingly, the security event aggregator and reporter tool automatically creates a trouble ticket or help desk ticket or alert when a security event occurs or is detected, such that the information technology support organization, system owner(s), system administrator(s), network administrator(s) and/or management personnel are automatically notified of the security event and do not have to search existing trouble tickets or help desk tickets to see if a system is affected by an existing security event. Moreover, the security event aggregator and reporter tool aggregates the security events detected for a system in an existing trouble ticket or help desk ticket, such that the information technology support organization, system owner(s), system administrator(s), network administrator(s) and/or management personnel can learn the nature and/or frequency of security event(s) occurring on a system with a specific IP address by referring to the existing trouble ticket or help desk ticket. Further, the security event aggregator and reporter tool escalates the trouble ticket or help desk ticket as the security event continues to occur, so that an organization's management personnel are eventually notified of the security event if no action is taken by the system owner(s), system administrator(s) and/or network administrator(s) to alleviate the security event. Furthermore, when the escalation process has been exhausted and/or when the security event ceases to occur, the security event aggregator and reporter tool automatically closes the alert or trouble ticket or help desk ticket, such that the information technology support organization does not have to waste time handling a non-existent security event.

In another embodiment, the invention provides a system for alerting an information technology support organization of a security event. The system includes an intrusion detection system configured to log in intrusion detection system logs a plurality of security events for a system within a network monitored by an information technology support organization, a trouble ticket alerting system configured to store therein a plurality of trouble tickets corresponding to the plurality of security events logged in the intrusion detection system logs and a security event aggregator and reporter tool configured to determine, at a pre-determined time interval, whether or not a recent security event among a plurality of logged security events in the intrusion detection system logs corresponds to an existing trouble ticket among the plurality of trouble tickets stored in the trouble ticket alerting system and wherein if the recent security event is determined to not correspond to the existing trouble ticket in the trouble ticket alerting system, the security event aggregator and reporter tool creates a new trouble ticket corresponding to the recent security event and notifies an owner of the system of the recent security event requesting that the owner alleviate the recent security event and wherein if the recent security event is determined to correspond to the existing trouble ticket in the trouble ticket alerting system, the security event aggregator and reporter tool establishes whether or not a pre-determined threshold for escalation has expired before escalating the existing trouble ticket corresponding to the recent security event to a higher notification level, such that the information technology support organization is requested to take appropriate action to alleviate the recent security event. In an embodiment, the security event aggregator and reporter tool is configured to parse the intrusion detection system logs having the plurality of security events logged therein. Further, the security event aggregator and reporter tool is configured to describe the recent security event in the new trouble ticket created and is further configured to provide an IP address for the system and to provide a timestamp corresponding to the recent security event. If the recent security event is determined to correspond to the existing trouble ticket and if the pre-determined threshold for escalation has not expired, the security event aggregator and reporter tool is further configured to log the security event in the existing trouble ticket before notifying the owner of the system requesting alleviation of the recent security event and is configured to discontinue processing the recent security event at the system with the IP address until a next pre-determined time interval. However, if the recent security event is determined to correspond to the existing trouble ticket and if the pre-determined threshold for escalation has expired, the security event aggregator and reporter tool is further configured to log the security event in the existing trouble ticket, to notify the owner of the system that the system will be disconnected from the network and to notify the information technology support organization to disconnect the system from the network. In an embodiment, the security event aggregator and reporter tool is further configured to close the existing trouble ticket either if the recent security event has been alleviated or after the information technology support organization has disconnected the system from the network.

Figure 2:
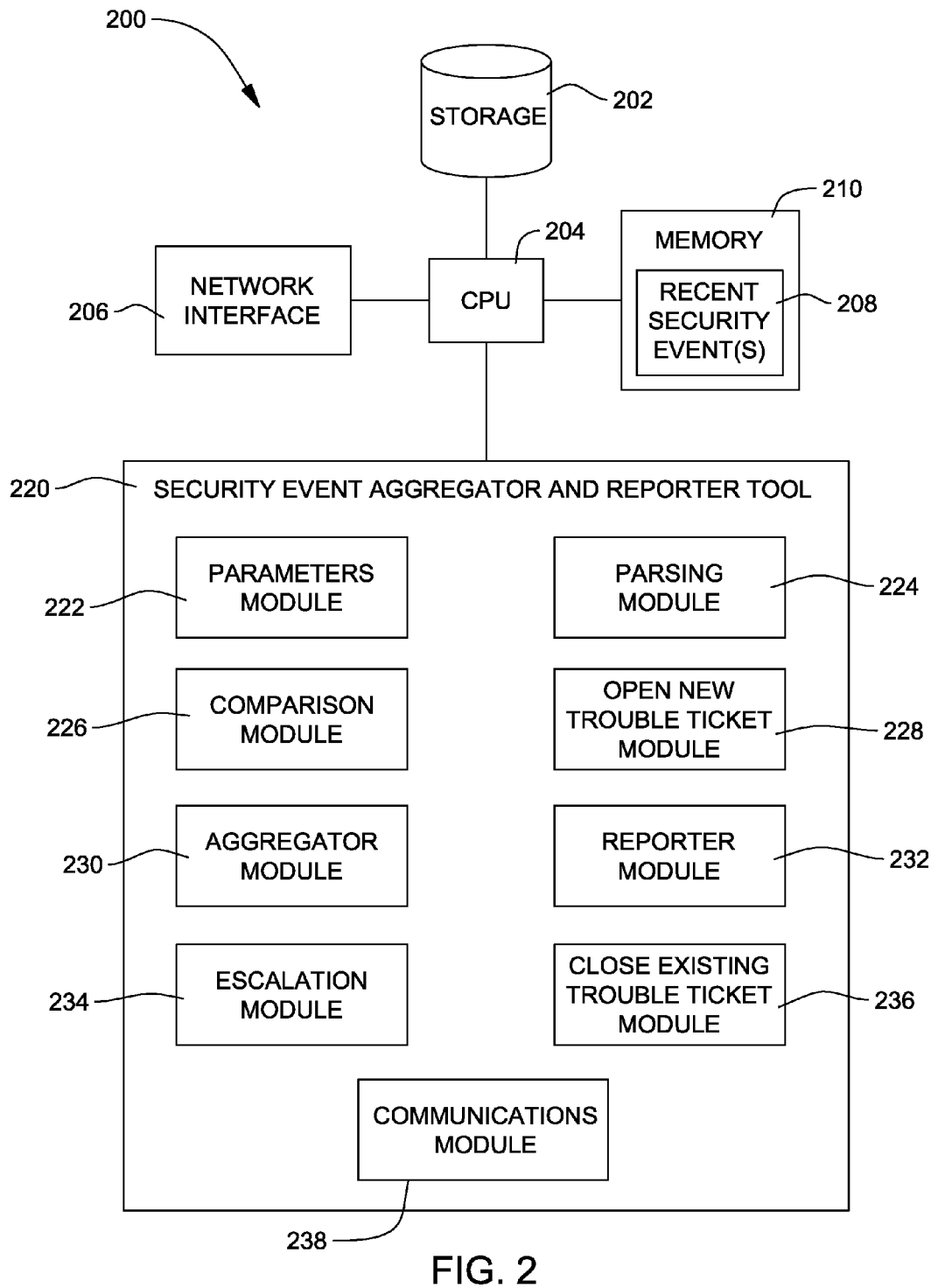
FIG. 2 is a schematic block system diagram illustrating an embodiment of a system for alerting an information technology support organization of a security event, in accordance with an embodiment of the present invention.

Reference is now made to FIG. 2, which illustrates an embodiment of a system 200 for alerting an information technology support organization of the occurrence of a security event on a system on a network. Turning to FIG. 2, FIG. 2 is a schematic block system diagram illustrating one embodiment of a system or server 200 having a security event aggregator and reporter tool 220 deployed thereon, the security event aggregator and reporter tool or component 220 being configured to alert an information technology support organization of the occurrence of a security event, in accordance with an embodiment of the invention. Preferably, the system 200 is a server that includes a central processing unit (CPU) 204, a local storage device 202, a network interface 206, and a memory 210. The CPU 204 is configured generally to execute operations within the system/server 200. The network interface 206 is configured, in one embodiment, to facilitate network communications between the system 200 and other systems over a communications channel of a network (not shown in any of the drawings). For instance, the network interface 206 provides an interface for communicating with an intrusion detection system and/or for communicating with a trouble ticket or help desk ticket alerting system. In an embodiment, the local memory 210 is configured to store recent or latest security events 208 that are logged for the system 200 each time the security event aggregator and reporter tool 220 is run. Alternatively, the recent security events 208 may be stored in storage 202. Further, in an embodiment, a copy of the intrusion detection system logs and/or existing trouble tickets or help desk tickets may be stored in the storage 202.

In one embodiment, as shown in FIG. 2, the security event aggregator and reporter tool or component 220 which runs on the server or system 200 comprises a logic unit that contains a plurality of modules configured to functionally execute the necessary steps of alerting an information technology support organization of the occurrence of a recent security event on a system on a network. In particular, the security event aggregator and reporter tool or component 220 includes a parameters module 222, a parsing module 224, a comparison module 226, an open new trouble ticket module 228, an aggregator module 230, a reporter module 232, an escalation module 234 and a close existing trouble ticket module 236. In an embodiment, the parameters module 222 of the security event aggregator and reporter tool 220 is configured to set forth a predetermined time interval that the security event aggregator and reporter tool will be run in order to detect recent or latest security events, such as, viruses or worm outbreaks on one or more system(s). Further, the parsing module 224 is configured to read an intrusion detection system log or logs for recent or latest security events that have occurred and have been captured by an intrusion detection system since the last time the security event aggregator and reporter tool was run. Further, the comparison module 226 is configured to determine if the IP address for a system on which the recent security event occurred or is detected, a description or type of the security event and/or timestamp captured or logged for the recent security event in the intrusion detection system log(s) matches any existing trouble tickets or help desk tickets stored in the trouble ticket alerting system. Furthermore, the open new trouble ticket module 228 is configured to create or open a new trouble ticket for the latest or recent security event if no existing trouble ticket is found in the trouble ticket alerting system. Moreover, the aggregator module 230 is configured to log the latest or recent security event in an existing trouble ticket if an existing trouble ticket is found in the trouble ticket alerting system. The reporter module 232 is configured to send notification to an appropriate party in order to report the occurrence of the security event on a system as per the chain of notification set forth in the escalation module 234 (described herein below), such as, the system owner, system administrator, network administrator and/or management personnel. Additionally, the escalation module 234 is configured to set forth the chain of notification, such that, the information technology support organization can escalate an existing trouble ticket by notifying the appropriate party beyond the system owner, such as, system administrator(s), network administrator(s) and/or management personnel regarding the security event that is detected on a system. For instance, the escalation module 234 may be configured to notify a system administrator if the system owner does not alleviate the security event or, further, may be configured to notify management if a system administrator or a network administrator does not alleviate the security event. Further, the close existing trouble ticket module 236 is configured to close an existing trouble ticket when a security event ceases to occur and/or when an affected system has been disconnected from the network. Further, the communications module 238 is configured to facilitate communications between the different modules in the security event aggregator and reporter tool 220 and for facilitating notification or communication with the system owner, system administrator, network administrator and/or management regarding the occurrence of the security event and/or for sending communications regarding disconnecting an affected system on which a security event continues to occur.

In yet another embodiment, the invention provides a computer program product for alerting an information technology support organization of the occurrence of a security event on a system on a network. The computer program product comprises a computer readable or computer-usable medium, which provides program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. Preferably, the computer storage medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. Further, preferably, network medium can comprise of transmission devices on a network, such as, cables, routers, switches and/or network adapter cards.

The computer program product further comprises first program instructions to store in a trouble ticket alerting system a plurality of trouble tickets corresponding to a plurality of logged security events for a system on a network monitored by an information technology support organization and second program instructions to determine, at a pre-determined time interval, whether or not a recent security event among one or more recently logged security events stored in intrusion detection system logs corresponds to an existing trouble ticket among the plurality of trouble tickets stored in the trouble ticket alerting system, the one or more recently logged security events being logged within the pre-determined time interval. In an embodiment, the second program instructions include instructions to parse the intrusion detection system logs for the one or more recently logged security events. Further, the computer program product includes third program instructions to automate creation of a new trouble ticket in the trouble ticket alerting system if the recent security event does not correspond to the existing trouble ticket stored in the trouble ticket alerting system and if the recent security event corresponds to the existing trouble ticket stored in the trouble ticket alerting system, the third program instructions include instructions to establish whether or not a pre-determined threshold for escalation has expired before escalating the existing trouble ticket corresponding to the recent security event, such that the information technology support organization is alerted of the recent security event and can take appropriate action to alleviate the recent security event. In an embodiment, the computer program product further includes fourth program instructions to close the new trouble ticket created for the recent security event either if the recent security event has been alleviated or if the new trouble ticket created has been escalated and to close the existing trouble ticket corresponding to the recent security event either if the recent security event has been alleviated or if the new trouble ticket created has been escalated. In an embodiment, the computer program product wherein the third program instructions include instructions to describe in the new trouble ticket created the recent security event, to provide an IP address for the system and to provide a timestamp corresponding to the recent security event. In an embodiment, the third program instructions include instructions to log the recent security event in the existing trouble ticket before notifying an owner of the system to alleviate the recent security event and further includes instructions to stop processing the recent security event at the system with the IP address until a next pre-determined time interval. If the recent security event is determined to correspond to the existing trouble ticket and if the pre-determined threshold for escalation has expired, the third program instructions include instructions to log the recent security event in the existing trouble ticket, to notify the owner of the system that the system will be disconnected from the network and to notify the information technology support organization to disconnect the system from the network. In an embodiment, each of the first, second, third and fourth program instructions are stored on the computer readable medium.

Figure 3:
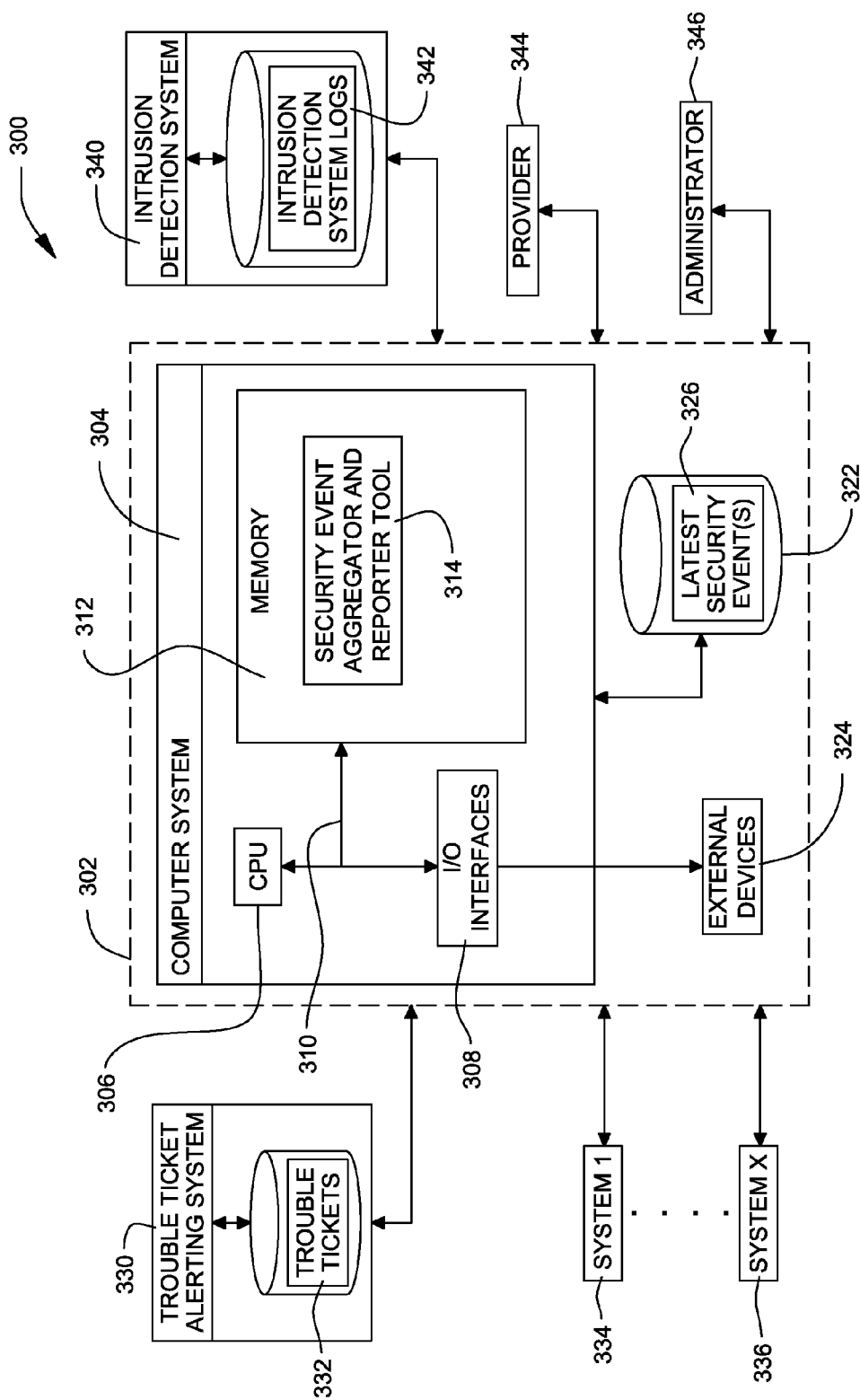
FIG. 3 is a schematic block system diagram illustrating an embodiment of a computer infrastructure for alerting an information technology support organization of a security event, in accordance with an embodiment of the invention.

Referring now to FIG. 3, there is illustrated a system 300 for alerting an information technology support organization of the occurrence or detection of a security event, in accordance with an embodiment of the present invention. As depicted, system 300 includes a computer infrastructure 302, which is intended to represent any type of computer architecture that is maintained in a secure environment (i.e., for which access control is enforced). As shown, infrastructure 302 includes a computer system 304 that typically represents a server 304 or the like configured to alert an information technology support organization of the occurrence or detection of a security event on a system (e.g., a personal computer, a laptop, a handheld device, etc.) connected to the infrastructure 302, such as system 1, reference numeral 334 and/or up to system X, reference numeral 336. It should be understood, however, that although not shown, other hardware and software components (e.g., additional computer systems, routers, firewalls, etc.) could be included in system 300.

In general, a user at a system (for instance, system 1, reference numeral 334) is connected via a network to infrastructure 302, which includes a security event aggregator and reporter tool or component 314 that is configured to alert an information technology support organization of the occurrence or detection of a security event on a system on a network, such as, on system 1, reference numeral 334. Similarly, one or more users at other systems connected to the infrastructure 302 can interface with infrastructure 302. To this extent, infrastructure 302 provides a secure environment. In particular, a user at system 1, reference numeral 334, for example, a personal computer, a laptop, a handheld device, etc., accesses the server or system 304 over a network via interfaces (e.g., web browsers) loaded on system 1, reference numeral 334. In the case of the latter, the network can be any type of network such as the Internet, a local area network (LAN), a wide area network (WAN), a virtual private network (VPN), etc. In any event, communication with infrastructure 302 could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties could utilize an Internet service provider to establish connectivity to infrastructure 302. It should be understood that under the present invention, infrastructure 302 could be owned and/or operated by a party such as provider 344, or by an independent entity. Regardless, use of infrastructure 302 and the teachings described herein could be offered to the parties on a subscription or fee-basis. In either scenario, an administrator 346, such as a system administrator and/or a network administrator, could support and configure infrastructure 302.

The computer system or server 304 is shown to include a CPU (hereinafter "processing unit 306"), a memory 312, a bus 310, and input/output (I/O) interfaces 308. Further, the computer system or server 304 is shown in communication with external I/O devices/resources 324 and storage system 322. In general, processing unit 306 executes computer program code, such as the security event aggregator and reporter tool or component 314. In an embodiment, the security event aggregator and reporter tool 314 deployed on the computer system 304 is configured to access and parse the intrusion detection system logs 342 corresponding to security events that are stored in the intrusion detection system 340. Further, the security event aggregator and reporter tool 314 is configured to access the trouble ticket or help desk alerting system 330, which stores existing help desk tickets or trouble tickets 332, so that the security event aggregator and reporter tool 314 can check to see whether or not a security event logged in the intrusion detection system logs 342 matches any existing trouble tickets 332 stored in the trouble ticket alerting system 330. While executing computer program code, the processing unit 306 executes the security event aggregator and reporter tool 314 to read and/or write data, to/from memory 312, storage system 322, and/or I/O interfaces 308. For instance, in one embodiment, the latest or recent security event(s) 322 are stored in storage 322 and can be accessed by the computer system or server 304. Alternatively, the recent security event(s) 322 could be stored in a separate storage within the infrastructure 302. Bus 310 provides a communication link between each of the components in computer system 300, such that information can be communicated within the infrastructure 302. External devices 324 can comprise any devices (e.g., keyboard, pointing device, display, etc.) that enable a user to interact with computer system 300 and/or any devices (e.g., network card, modem, etc.) that enable server 304 to communicate with one or more other computing devices.

Computer infrastructure 302 is only illustrative of various types of computer infrastructures for implementing the invention. For example, in one embodiment, computer infrastructure 302 comprises two or more computing devices (e.g., a server cluster) that communicate over a network to perform the various process steps of the invention. Moreover, computer system 300 is only representative of various possible computer systems that can include numerous combinations of hardware. To this extent, in other embodiments, computer system 300 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 306 may comprise a single processing unit, or be distributed across one or more processing units in one or more locations, e.g., on a client and server. Similarly, memory 312 and/or storage system 322 can comprise any combination of various types of data storage and/or transmission media that reside at one or more physical locations. Further, I/O interfaces 308 can comprise any system for exchanging information with one or more external devices 324. Still further, it is understood that one or more additional components (e.g., system software, math co-processing unit, etc.) not shown in FIG. 3 can be included in computer system 300. However, if computer system 300 comprises a handheld device or the like, it is understood that one or more external devices 324 (e.g., a display) and/or storage system(s) 322 could be contained within computer system 304, and not externally as shown.

Storage system 322 can be any type of system (e.g., a database) capable of providing storage for information under the present invention. To this extent, storage system 322 could include one or more storage devices, such as a magnetic disk drive or an optical disk drive. In another embodiment, storage system 322 includes data distributed across, for example, a local area network (LAN), wide area network (WAN) or a storage area network (SAN) (not shown). Although not shown, additional components, such as cache memory, communication systems, system software, etc., may be incorporated into computer system 300.

Further, in yet another embodiment, the invention provides a process for deploying computing infrastructure includes integrating computer-readable code into a computing system, wherein the code in combination with the computing system is capable of performing a process for alerting an information technology support organization of a security event. The process includes storing in a trouble ticket alerting system a plurality of trouble tickets corresponding to a plurality of logged security events for a system on a network monitored by an information technology support organization, and providing an intrusion detection system for logging the plurality of logged security events into intrusion detection system logs. Further, the process includes analyzing, at a pre-determined time interval, intrusion detection system logs for one or more recently logged security events of the plurality of logged security events, the one or more recently logged security events being logged within the pre-determined time interval and comparing a recent security event of the one or more recently logged security events to each of the plurality of trouble tickets stored in the trouble ticket alerting system and if the recent security event does not match an existing trouble ticket, automatically creating a new trouble ticket in the trouble ticket alerting system and if the recent security event matches the existing trouble ticket, escalating the existing trouble ticket to a highest notification level, wherein the information technology support organization is alerted of the recent security event so that appropriate action can be taken to alleviate the recent security event. The process further includes closing any trouble ticket corresponding to the recent security event after appropriate action has been taken to alleviate the recent security event. In an embodiment, the comparing step includes ascertaining whether or not an IP address of the system having the recent security event matches an existing IP address in the existing trouble ticket stored in the trouble ticket alerting system and, if there is an existing trouble ticket, determining if a pre-determined time threshold for escalating the existing trouble ticket corresponding to the recent security event has expired. Further, if the pre-determined time threshold for escalating the existing trouble ticket corresponding to the recent security event has not expired, the process includes logging the recent security event in the existing trouble ticket stored in the trouble ticket alerting system. However, if the pre-determined time threshold for escalating the existing trouble ticket corresponding to recent security event has expired, the process includes establishing whether or not the existing trouble ticket corresponding to the recent security event has been escalated to a highest notification level, if the existing trouble ticket corresponding to the recent security event has not been escalated to the highest notification level, escalating to a next notification level the existing trouble ticket corresponding to the recent security event, logging the recent security event in the existing trouble ticket, notifying the owner of the system to request alleviation of the recent security event and discontinuing processing the recent security event at the system with the IP address until a next pre-determined time interval. Further, if the existing trouble ticket corresponding to the recent security event has been escalated to the highest notification level, the process includes logging the recent security event in the existing trouble ticket, notifying the owner of the system that the system will be disconnected from the network, sending to the information technology support organization a request to disconnect the system from the network and closing the existing trouble ticket after the information technology support organization has disconnected the system from the network.

Accordingly, any of the components of the present invention as shown in FIG. 3 can be deployed, managed, serviced by a service provider 344 who offers to provide alerts to an information technology support organization of the occurrence or detection of a security event on a system on a network. Preferably, the invention provides a business method that performs the process steps of the invention on a subscription, advertising and/or fee basis. In particular, a service provider, such as a solution integrator could offer to alert an information technology support organization of the occurrence or detection of a security event on a system on a network. In this case, the service provider can, for instance, create, maintain, and support a computer infrastructure that performs the process steps of the invention for one or more customers. In return, the service provider can receive payment from the customer or customers under a subscription and/or fee agreement and/or the service provider can receive payment from the sale or advertising of content to one or more third parties.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of alerting an information technology support organization of a security event, said method comprising the steps of:
   storing in a trouble ticket alerting system a plurality of trouble tickets corresponding to a plurality of logged security events for a system on a network monitored by an information technology support organization;
   analyzing, at a pre-determined time interval, intrusion detection system logs for one or more recently logged security events of said plurality of logged security events, said one or more recently logged security events being logged within said pre-determined time interval;
   comparing a recent security event of said one or more recently logged security events to each of said plurality of trouble tickets stored in said trouble ticket alerting system; and
   if said recent security event does not match an existing trouble ticket, automatically creating a new trouble ticket in said trouble ticket alerting system, and if said recent security event matches said existing trouble ticket, escalating said existing trouble ticket, wherein said information technology support organization is alerted of said recent security event so that appropriate action can be taken to alleviate said recent security event.

2. The method according to claim 1, further comprising the steps of:
   providing said trouble ticket alerting system for storing therein said plurality of trouble tickets corresponding to said plurality of logged security events; and
   providing an intrusion detection system for logging said plurality of logged security events into said intrusion detection system logs.

3. The method according to claim 2, wherein said analyzing step further comprises the step of:
   parsing said intrusion detection system logs having said one or more logged security events for said system on said network.

4. The method according to claim 3, wherein said creating step further comprises the steps of:
   notifying an owner of said system regarding said recent security event; and
   requesting that said owner alleviate said recent security event.

5. The method according to claim 4, wherein said escalating step further comprises the steps of:
   ascertaining whether or not an IP address of said system having said recent security event matches an existing IP address in said existing trouble ticket stored in said trouble ticket alerting system; and
   if there is said existing trouble ticket, determining if a pre-determined time threshold for escalating said existing trouble ticket corresponding to said recent security event has expired.

6. The method according to claim 5, wherein said determining step further comprises the step of:
   if said pre-determined time threshold for escalating said existing trouble ticket corresponding to said recent security event has not expired, logging said recent security event in said existing trouble ticket stored in said trouble ticket alerting system.

7. The method according to claim 6, wherein said determining step further comprises the steps of:
   if said pre-determined time threshold for escalating said existing trouble ticket corresponding to said recent security event has expired, establishing whether or not said existing trouble ticket corresponding to said recent security event has been escalated to a highest notification level;
   if said existing trouble ticket corresponding to said recent security event has not been escalated to said highest notification level, escalating to a next notification level said existing trouble ticket corresponding to said recent security event;
   logging said recent security event in said existing trouble ticket;
   notifying said owner of said system to request alleviation of said recent security event; and
   discontinuing processing said recent security event at said system with said IP address until a next pre-determined time interval.

8. The method according to claim 7, wherein said establishing step further comprises the steps of:
   if said existing trouble ticket corresponding to said recent security event has been escalated to said highest notification level, logging said recent security event in said existing trouble ticket;
   notifying said owner of said system that said system will be disconnected from said network;
   sending to said information technology support organization a request to disconnect said system from said network; and
   closing said existing trouble ticket after said information technology support organization has disconnected said system from said network.

9. A system for alerting an information technology support organization of a security event, comprising:
   an intrusion detection system configured to log in intrusion detection system logs a plurality of security events for a system within a network monitored by an information technology support organization;
   a trouble ticket alerting system configured to store therein a plurality of trouble tickets corresponding to said plurality of security events logged in said intrusion detection system logs; and
   a security event aggregator and reporter tool configured to determine, at a pre-determined time interval, whether or not a recent security event among a plurality of logged security events in said intrusion detection system logs corresponds to an existing trouble ticket among said plurality of trouble tickets stored in said trouble ticket alerting system; and wherein if said recent security event is determined to not correspond to said existing trouble ticket in said trouble ticket alerting system, said security event aggregator and reporter tool creates a new trouble ticket corresponding to said recent security event and notifies an owner of said system of said recent security event requesting that said owner alleviate said recent security event; and wherein if said recent security event is determined to correspond to said existing trouble ticket in said trouble ticket alerting system, said security event aggregator and reporter tool establishes whether or not a pre-determined threshold for escalation has expired before escalating said existing trouble ticket corresponding to said recent security event to a higher notification level, such that said information technology support organization is requested to take appropriate action to alleviate said recent security event.

10. The system according to claim 9, wherein said security event aggregator and reporter tool is configured to parse said intrusion detection system logs having said plurality of security events logged therein.

11. The system according to claim 10, wherein said security event aggregator and reporter tool is further configured to describe said recent security event in said new trouble ticket created, and is further configured to provide an IP address for said system and to provide a timestamp corresponding to said recent security event.

12. The system according to claim 11, wherein if said recent security event is determined to correspond to said existing trouble ticket and if said pre-determined threshold for escalation has not expired, said security event aggregator and reporter tool is further configured to log said security event in said existing trouble ticket before notifying said owner of said system requesting alleviation of said recent security event and is configured to discontinue processing said recent security event corresponding to said system with said IP address until a next pre-determined time interval.

13. The system according to claim 12, wherein if said recent security event is determined to correspond to said existing trouble ticket and if said pre-determined threshold for escalation has expired, said security event aggregator and reporter tool is further configured to log said security event in said existing trouble ticket, to notify said owner of said system that said system will be disconnected from said network and to notify said information technology support organization to disconnect said system from said network.

14. The system according to claim 13, wherein said security event aggregator and reporter tool is further configured to close said existing trouble ticket either if said recent security event has been alleviated or after said information technology support organization has disconnected said system from said network.

15. A computer program product loaded into the internal memory of a computer for alerting an information technology support organization of a security event, said computer program product comprising:
a computer readable medium;
first program instructions to store in a trouble ticket alerting system a plurality of trouble tickets corresponding to a plurality of logged security events for a system on a network monitored by an information technology support organization;
second program instructions to determine, at a pre-determined time interval, whether or not a recent security event among one or more recently logged security events stored in intrusion detection system logs corresponds to an existing trouble ticket among said plurality of trouble tickets stored in said trouble ticket alerting system, said one or more recently logged security events being logged within said pre-determined time interval;
third program instructions to automate creation of a new trouble ticket in said trouble ticket alerting system if said recent security event does not correspond to said existing trouble ticket stored in said trouble ticket alerting system, and if said recent security event corresponds to said existing trouble ticket stored in said trouble ticket alerting system, said third program instructions include instructions to establish whether or not a pre-determined threshold for escalation has expired before escalating said existing trouble ticket corresponding to said recent security event, such that said information technology support organization is alerted of said recent security event and can take appropriate action to alleviate said recent security event; and wherein said first, second and third program instructions are stored on said computer readable medium.

16. The computer program product according to claim 15, further comprising:
fourth program instructions to close said new trouble ticket created for said recent security event either if said recent security event has been alleviated or if said new trouble ticket created has been escalated, and to close said existing trouble ticket corresponding to said recent security event either if said recent security event has been alleviated or if said new trouble ticket created has been escalated; and wherein said fourth program instructions are stored on said computer readable medium.

17. The computer program product according to claim 16, wherein said second program instructions include instructions to parse said intrusion detection system logs for said one or more recently logged security events.

18. The computer program product according to claim 17, wherein said third program instructions include instructions to describe in said new trouble ticket created said recent security event, to provide an IP address for said system and to provide a timestamp corresponding to said recent security event.

19. The computer program product according to claim 18, wherein said third program instructions include instructions to log said recent security event in said existing trouble ticket before notifying an owner of said system to alleviate said recent security event, and further includes instructions to stop processing said recent security event at said system with said IP address until a next pre-determined time interval.

20. The computer program product according to claim 19, wherein if said recent security event is determined to correspond to said existing trouble ticket and if said pre-determined threshold for escalation has expired, said third program instructions include instructions to log said recent security event in said existing trouble ticket, to notify said owner of said system that said system will be disconnected from said network and to notify said information technology support organization to disconnect said system from said network.

21. A process for deploying computing infrastructure comprising integrating computer-readable code into a computing system, wherein said code in combination with said computing system is capable of performing a process for alerting an information technology support organization of a security event, said process comprising:
storing in a trouble ticket alerting system a plurality of trouble tickets corresponding to a plurality of logged security events for a system on a network monitored by an information technology support organization;
providing an intrusion detection system for logging said plurality of logged security events into intrusion detection system logs;
analyzing, at a pre-determined time interval, intrusion detection system logs for one or more recently logged security events of said plurality of logged security events, said one or more recently logged security events being logged within said pre-determined time interval;
comparing a recent security event of said one or more recently logged security events to each of said plurality of trouble tickets stored in said trouble ticket alerting system; and if said recent security event does not match an existing trouble ticket, automatically creating a new trouble ticket in said trouble ticket alerting system, and if said recent security event matches said existing trouble ticket, escalating said existing trouble ticket, wherein said information technology support organization is alerted of said recent security event so that appropriate action can be taken to alleviate said recent security event.

22. The process according to claim 21, further comprising the steps of:
closing any trouble ticket corresponding to said recent security event after appropriate action has been taken to alleviate said recent security event.

23. The process according to claim 22, wherein said escalating step further comprises the steps of:
ascertaining whether or not an IP address of said system having said recent security event matches an existing IP address in said existing trouble ticket stored in said trouble ticket alerting system; and
if there is said existing trouble ticket, determining if a pre-determined time threshold for escalating said existing trouble ticket corresponding to said recent security event has expired.

24. The process according to claim 23, wherein said determining step further comprises the step of:
if said pre-determined time threshold for escalating said existing trouble ticket corresponding to said recent security event has not expired, logging said recent security event in said existing trouble ticket stored in said trouble ticket alerting system.

25. The process according to claim 24, wherein said determining step further comprises the steps of:
if said pre-determined time threshold for escalating said existing trouble ticket corresponding to recent security event has expired, establishing whether or not said existing trouble ticket corresponding to said recent security event has been escalated to a highest notification level;
if said existing trouble ticket corresponding to said recent security event has not been escalated to said highest notification level, escalating to a next notification level said existing trouble ticket corresponding to said recent security event;
logging said recent security event in said existing trouble ticket;
notifying said owner of said system to request alleviation of said recent security event; and
discontinuing processing said recent security event at said system with said IP address until a next pre-determined time interval.

26. The process according to claim 25, wherein said establishing step further comprises the steps of:
if said existing trouble ticket corresponding to said recent security event has been escalated to said highest notification level, logging said recent security event in said existing trouble ticket;
notifying said owner of said system that said system will be disconnected from said network;
sending to said information technology support organization a request to disconnect said system from said network; and
closing said existing trouble ticket after said information technology support organization has disconnected said system from said network.

* * * * *